July 30, 1963 A. B. FAIN 3,099,302
FRUIT SECTIONIZING APPARATUS
Filed Jan. 9, 1962 3 Sheets-Sheet 3
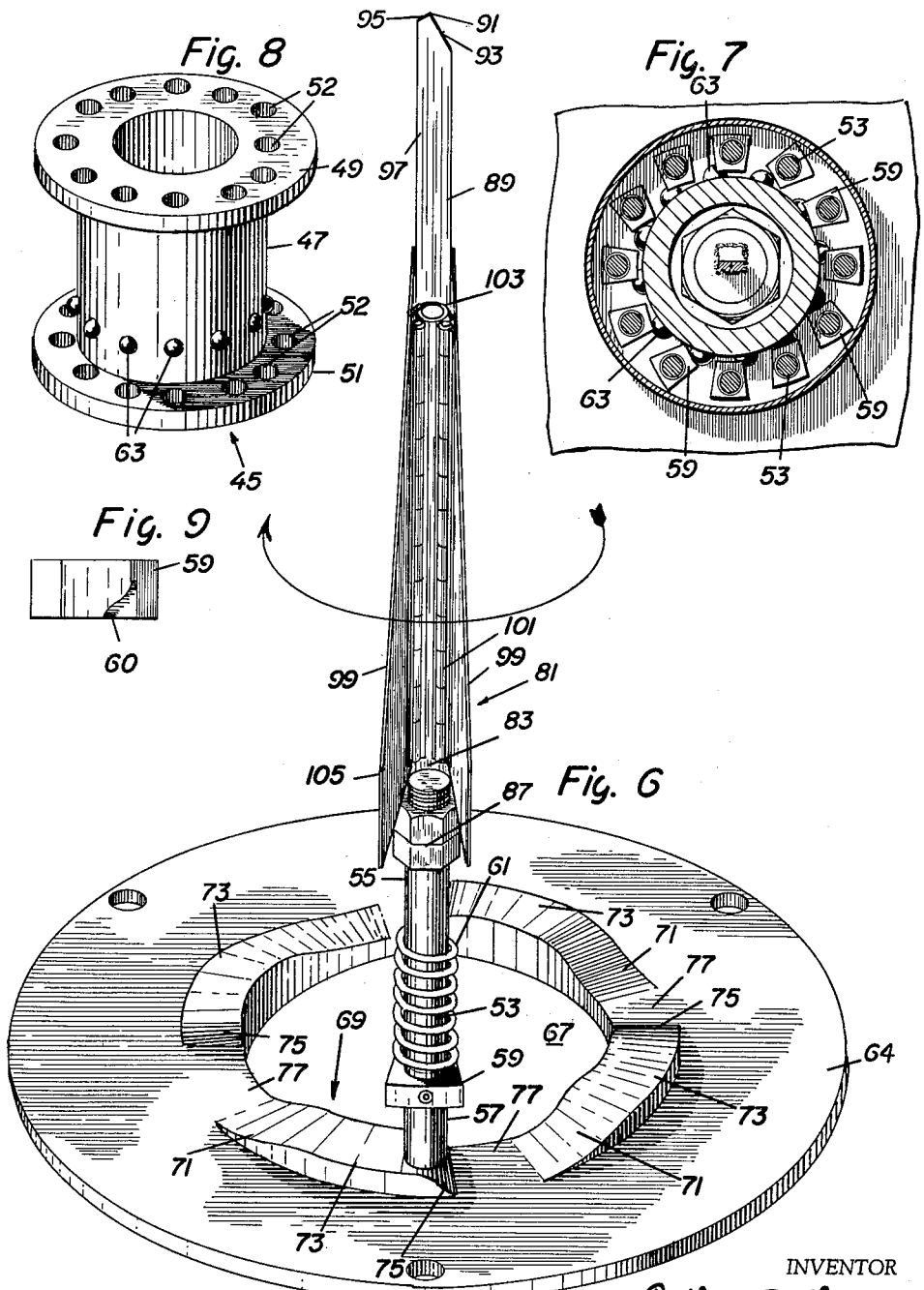
INVENTOR
Arthur B. Fain
BY Peck & Peck
ATTORNEYS

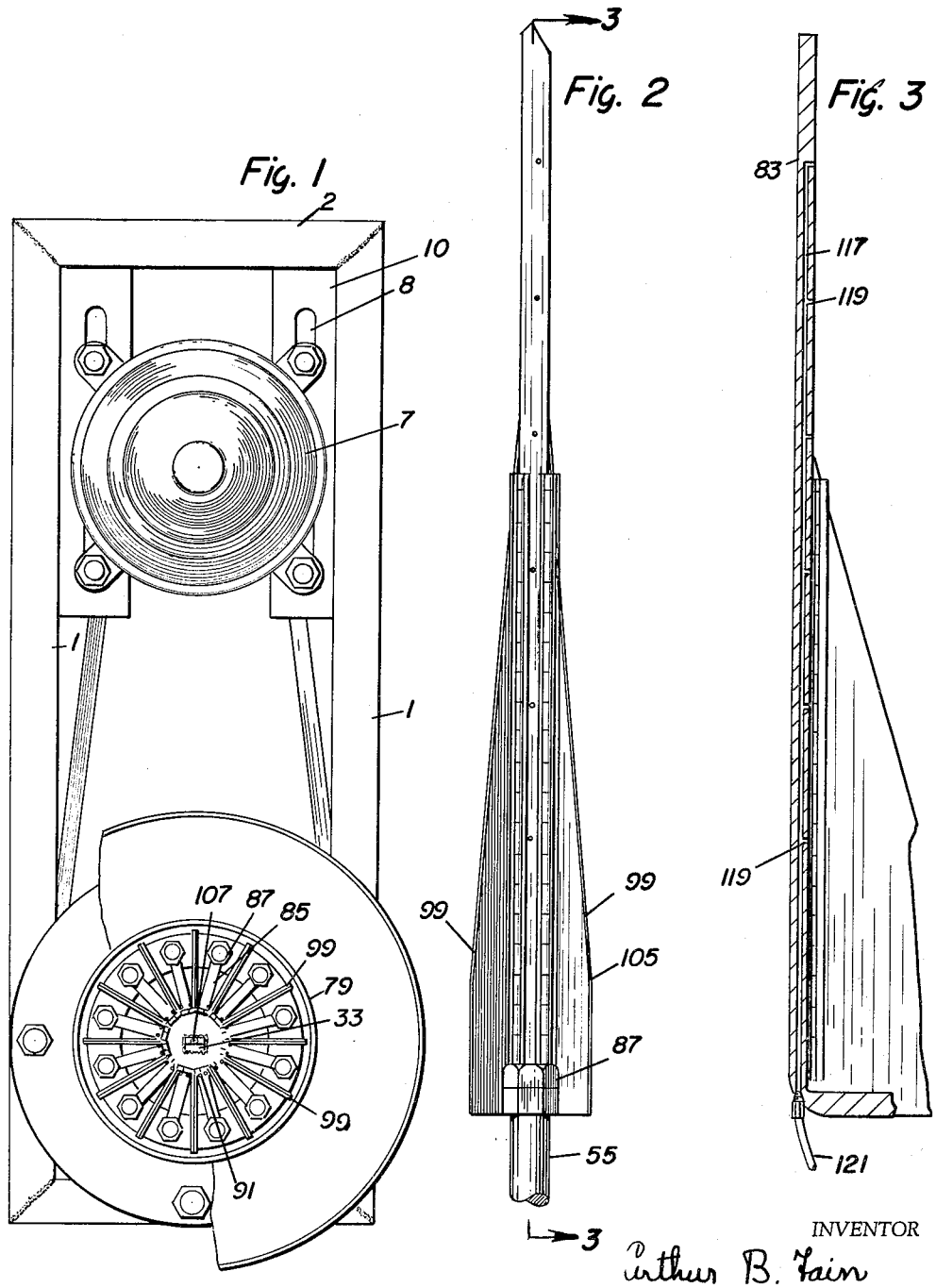

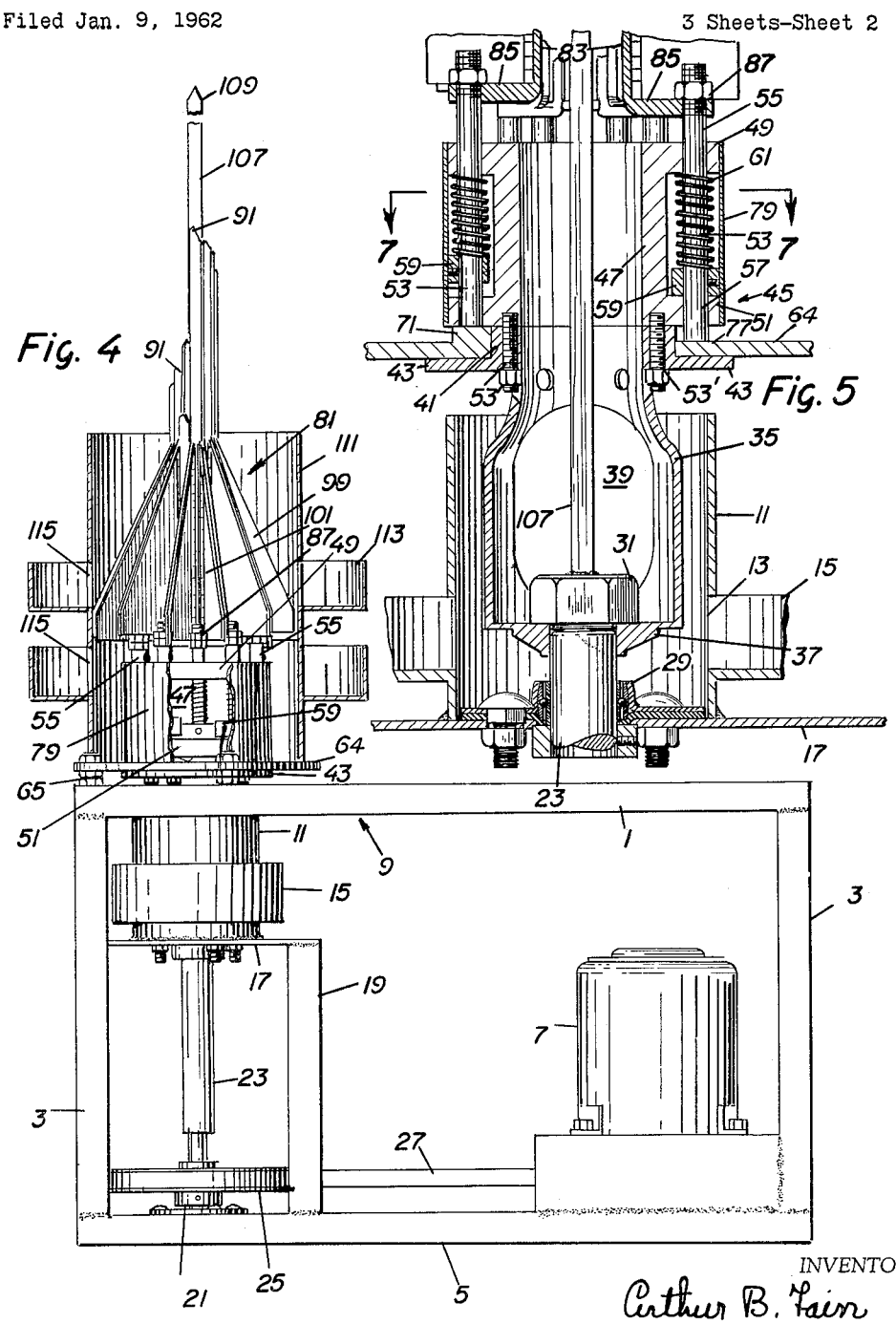

United States Patent Office 3,099,302
Patented July 30, 1963

3,099,302
FRUIT SECTIONIZING APPARATUS
Arthur B. Fain, R.F.D. 1, Sevierville, Tenn.
Filed Jan. 9, 1962, Ser. No. 165,109
8 Claims. (Cl. 146—3)

This invention relates broadly to the art of removing the sections of fruits from fruits such as citrus fruits, and in its more specific aspects it relates to an automatic apparatus whereby the edible meat sections of a citrus or the like fruit are separated from the membranes as units and ejected from the apparatus for ultimate use, such as canning; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

In the operation of canning citrus fruits and the like it is necessary to remove the segments or sections of valuable edible fruit from the separating membranes and the core of the fruit. In this operation it is highly desirable that the sections be removed in good condition, not torn or ragged, but as full-bodied units. In such operations of preparing the fruit preparatory to canning, it is conventional practice to perform the major portion of the sectionizing or segmenting operation by hand. In many operations of this character of which I am aware each individual fruit may be placed on a holder or spindle whereupon an operator with a knife manually cuts each edible fruit segment from its membranes so that unitary sections or segments are provided for canning.

With the increasing popularity of canned fruits it will be recognized that such manual segmenting operations are not only slow but also costly in the requirement of many operators to provide fruit segments in large canning operations. It will also be recognized that the human element is ever present in such manual operations, resulting in waste from improperly cut fruit segments which either cannot be used or must be sold as below top grade products and at lower prices with less profit.

It is evident that there has been and now exists a long need for an efficient and economic apparatus which automatically sectionizes fruits, such as citrus fruits.

In view of this need it has been one of my prime purposes to develop an apparatus which automatically separates the edible and valued fruit sections from adjacent membranes and from the core of the fruit.

It has been a further object of my invention to devise such an apparatus which cleanly separates the segments from the non-edible portions of the fruit to provide full-bodied, untorn fruit segments.

The automatic apparatus which I have devised needs only one operator whose major function is to keep the apparatus loaded with fruit to be operated on, and this one operator will be able to produce a tremendous number of fruit segments in comparison with an operator who has heretofore manually separated and cut each individual segment from its membranes and the core of the fruit.

In accomplishing the desired purposes my automatic fruit sectionizing apparatus also, in one operation, separates not only the edible fruit section from its adjacent membranes but also separates its apex from the core, and it functions to separate all the segments of an individual fruit in one operation and simultaneously. Thus, the former slow and costly procedure of separating each segment, one at a time, is eliminated.

My invention involves means which insures the proper separation and cutting of the segments from the membranes and the core. It involves auxiliary means for aiding separation of the core from the segments and for loosening of the seeds.

This apparatus is relatively inexpensive to produce and to operate, and under normal use conditions will require little or no maintenance care. It is also a highly advantageous feature of my invention that it does not require a skilled operator to view it and to keep it loaded with fruit.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a top plan view of the apparatus with a part thereof broken away.

FIG. 2 is a view in elevation of one of the blades of my apparatus.

FIG. 3 is a view taken on line 3—3 of FIG. 2.

FIG. 4 is a view in side elevation of the apparatus, with parts thereof broken away.

FIG. 5 is an enlarged detailed sectional view of certain operating components of my invention, the shield and troughs not being shown.

FIG. 6 is an enlarged view in elevation showing a blade and the cam means which imparts reciprocatory motion to each blade.

FIG. 7 is a view taken on line 7—7 of FIG. 5.

FIG. 8 is a view of the operating hub of the apparatus.

FIG. 9 is a view of one of the cam blocks which is fixed to each blade.

In the accompanying drawings, and particularly in FIGS. 1 and 4 thereof, I show my complete fruit sectionizing apparatus which may be supported on a framework comprising upper longitudinal members 1 connected at their ends by transverse members 2, the members 1 and 2 being supported by legs 3. A lower platform 5 fixedly extends between the legs and supports in any suitable manner a source of power for operating the apparatus, such as an electric motor 7. The motor may be adjustably mounted as in slots 8 which are formed in ledges 10. I have used the numeral 9 to designate my fruit sectionizing apparatus in its entirety. The apparatus comprises a stationary cylindrical shield 11 which is formed with a plurality of circumferentially spaced openings 13 therein forming ejection openings from the interior of the shield into an annular collection trough 15 which is fixed to and extends radially from the shield. The lower end of the shield is supported on and welded or otherwise affixed to a platform 17 which is fixed to one of the legs 3 at one end and at its other end is supported by a leg 19 resting on lower platform 5.

Journaled at at 21 on platform 5 is an operating shaft 23 which extends upwardly from the journal bearing 21. A pulley 25 is fixed to the lower end of the shaft and a belt 27 operatively connects the pulley with the drive shaft of the motor 7. Thus, when the motor is operated, the operating shaft 23 will be caused to rotate through the medium of the belt and pulley.

The operating shaft 23 extends upwardly from its journaled base through platform 17 and a ball bearing assembly 29 which is fixed on the platform. A nut 31 is threaded to or otherwise affixed to the upper end of the operating shaft 23, and the nut 31 is provided with a cavity 33 therein for a purpose to be hereinafter described.

I provide a tubular rotary element 35 which is splined or otherwise fixed to shaft 23 as at 37, the tubular element being formed with apertures or ejection openings 39, the purpose of which will be explained. At its upper end the tubular rotary element is formed with a thickened neck portion 41 from the lower end of which a radially extending annular flange 43 projects. Resting on the thickened portion 41 of tubular element 35 is a hub designated generally by numeral 45. This hub consists of a body portion 47, an upper radially extending annular flange 49, and a lower radially extending annular flange 51. The hub 45 is fixed to the tubular member 35 for rotation therewith by means of screws or the like 53'.

The flanges 49 and 51 are formed with a plurality of aligned holes 52 therethrough, preferably twelve of such holes being provided, and a push rod 53 slidably extends through each pair of aligned holes and is of a length greater than the distance between flanges 49 and 51 to provide an upper extending portion 55 and a lower extending portion 57. Fixed to each push rod 53 is a cam and spring block 59, and a spring 61 spirals about each push rod and is compressed between flange 49 and the cam and spring block. A series of circumferentially spaced lugs 63 are formed on body portion 47 of the hub, there being one lug for each pair of aligned holes 52 and the lugs being positioned to engage blocks 59 in a manner to be described. Each cam block is formed on its inner surface with a cam surface 60 of more or less serpentine formation, the cam surface coacting with a lug 63, as will be explained.

I provide an annular stationary cam plate 64 which is fixed as at 65 to bed 1, the cam plate being positioned on the flange 43 of rotary element 35 and the thickened portion of the tubular element extending upwardly through central opening 67 in the cam plate. It will now be appreciated that there is a sliding fit between flange 43 which rotates, and cam plate 64 which does not rotate. The cam plate is formed with camming surfaces which are adjacent the inner periphery thereof and are designated generally by the numeral 69. In this instance I show, by way of example, four such camming surfaces arranged in a ring, and each comprising a relatively sharp rise 75, a peak 73, and a relatively slow descent or fall 71. Each camming surface is separated by a flat area 77. When the cam plate 64 is fixed in position on bed 1, the camming surfaces 69 thereof are in position to be engaged by the lower ends of the lower extending portions 57 of push rods 53 as the push rods rotate to thereby impart a reciprocatory motion to the push rods.

The hub and push rod assembly is preferably housed within a casing 79 which may be fixed to the peripheral surface of flanges 49 and 51 in any suitable manner, providing not only a protective medium, but also a casing so that lubricant may be maintained about the push rods for their operation therein.

My apparatus comprises an assembly consisting of a plurality of coring and separating blades designated generally by the numeral 81, there being preferably twelve of such blades. Each blade 81 is of elongated structure and comprises a rigid spine 83 from the lower end of which laterally extends a connecting arm 85 through which the upper end 55 of a push rod 53 extends and is fixed by any suitable lock nut assembly 87. It is to be recognized that there is one coring and separating blade fixed to each push rod 83.

The upper portion 89 of each coring and separating blade 81 constitutes what I shall term a "coring blade" and at its upper end is formed with an apex or point 91 which is off center with respect to the longitudinal axial center line of each coring and separating blade for a purpose which will be described hereinafter. The edges 93 and 95 and the leading edges 97 of each blade are preferably sharpened. The lengths of all of the coring and separating blades are different, and since every blade is fixed to a push rod on the same horizontal plane, the apices 91 will not be on the same horizontal plane. I have so arranged the blades that from the shortest (the apex of which is lowest) the apices step up progressively in circular fashion to the highest apex.

Below each coring blade portion 89 I provide the separating portion of the coring and separating blade for separating the fruit segments from the membranes. I provide a pair of lateral blades 99 which are hingedly fixed by means of piano, or the like hinges, 101 to the spine of each coring and separating blade. The pair of blades 99 are preferably biased into fully separated position by means of hairpin springs 103. The blades 99 are formed of gradually extending width downwardly to a point 105 where their width is uniform for the remaining lower portion thereof.

Fixed within the cavity 33 in nut 31 for rotation therewith is an elongated center and guide rod 107 which extends upwardly through the circle of coring and separating blades 81 and extends a substantial distance above and therebeyond the longest coring and separating blade and is pointed as at 109. The center and guide rod being fixed to nut 31 rotates with shaft 23.

With the apparatus assembled in the manner described a fruit which has been peeled is forced onto center and guide rod 107, the rod being inserted through the approximate center of the peeled fruit with the segments thereof extending generally radially with respect to the guide rod 107. The motive power, such as electric motor 7, is then energized so that the shaft 23, the coring and separating blades, and the guide rod will be rotated. The operator of the apparatus continues to force fruit onto the guide rod which forces the fruit downwardly and onto the apices 91 of the coring and separating blades 81. This constant addition of fruit to the apparatus will cause the longest blade to first enter each fruit and the remaining blades to progressively enter the fruit. Since the coring and separating blades are arranged in circular fashion it will be recognized that the coring portions of the blades will enter each fruit at about the core thereof and will separate the core from the apex of each fruit section or segment. It will be further understood that the insertion of the blades into the fruit will be facilitated due to the arrangement of the blades to provide progressively shorter arrangement of the blades.

In inserting the coring portions of the blades into each fruit the pointed end of each blade will be positioned between two membranes at the apex of the fruit section. This is accomplished by reason of the construction wherein the point 91 of each blade is off center relative to the longitudinal axis of the blade. This construction causes a stretching of the membranes so that only one can pass between adjacent blades. If the blades were not so designed two membrances might go between adjacent blades.

As fruit is continually added to guide rod 107, fruit is forced down on to the separating portions of the coring and separating blades and each pair of lateral blades passes along the membranes of a fruit section and separates the section from its membranes. While this action is occurring the assembly and the fruit are rotating and the blades are given a reciprocatory motion since the push rods are riding over the stationary cam. This reciprocating action causes a corresponding sawing or the like action to be imparted to the lateral blades which substantially aids in the separation of the membranes from the fruit sections or segments. The separating result is also greatly aided by the centrifugal forces which are applied to each fruit due to the rotation of the blade assembly upon which the fruit is mounted. This centrifugal action will stretch the membranes so that the lateral blades will pass between each membrane and its fruit section easier and, if for any reason, a cut is imperfect this centrifugal force will throw the section out.

Not only have I devised means for imparting a reciprocating motion to the blades but I have also devised means for imparting an oscillatory or alternate rotary motion to each blade simultaneously with its reciprocatory motion. As each blade reciprocates the cam track 60 on each cam block 59 will be engaged with a lug 63 to cause a turning or part rotation of each blade on its upward stroke and on its downward stroke each blade will rotate back to its normal position under the action of spring 103. This rotary or oscillatory motion along with the reciprocatory motion facilitates the cutting and separating action of the blades.

In the operation of this apparatus the separated fruit sections will be thrown radially outwardly under the centrifugal forces generated by the rotating blade assembly and may be deflected by the circular shield 111 into any desired number of annular troughs 113 through the openings 115. It is to be understood that any other suitable arrangement may be provided for collecting the cut and separated fruit sections.

In FIG. 3 of the drawings I have illustrated a modified form of blade which I may use, and I have used the same reference numerals as heretofore used to designate similar parts. The spine 83 of each blade is formed with an axially extending duct 117 which extends from the bottom of the blade upwardly to a point preferably below the top of the blade. The lower end of the duct is open and is in communication with a tube or the like 121 which is connected to a source of air under pressure, or to a source of any other pressured medium. At spaced points along the spine I provide a plurality of jet openings 119 which are directed inwardly. When the apparatus is in operation and the duct is supplied with a pressured medium it will be ejected out of the openings 119 and into the fruit and will help to remove seeds and to separate the membranes from the fruit sections which are being cut and removed from the fruit. Any suitable means may be used for transferring the pressured medium from the source to the blades, for instance, the source may be mounted on the rotating assembly with a connection to each blade, or a manifold may be provided with a connection to each blade, and a single supply tube may be so in communication with the manifold that it may rotate while the tube remains stationary.

It will now be recognized that I have evolved a fruit sectionizing apparatus which constitutes a substantial advance over prior manual arrangements.

I claim:

1. A fruit sectionizing apparatus including, in combination, a blade assembly comprising a plurality of individual coring and separating blades and a plurality of push rods, each blade being mounted on and movable with a push rod and each of said push rods being slidably mounted for reciprocation in said blade assembly, means for imparting rotation to said blade assembly, the individual blades of said blade assembly adapted to receive a series of fruit for rotation therewith, the fruit being impaled on the ends of the blades and forced therealong by the impalement of additional fruit on the blade ends, and means in the path of movement of said push rods as they rotate with the blade assembly and engageable by the push rods to cause reciprocation of said push rods and the blades.

2. A fruit sectionizing apparatus in accordance with claim 1, wherein said last named means comprises a plurality of spaced cams having sharp rises and slow descents.

3. A fruit sectionizing apparatus including, in combination, a blade assembly comprising a plurality of individual coring and separating blades and a plurality of push rods, each blade being mounted on and movable with a push rod and each of said push rods being slidably mounted in said blade assembly for reciprocatory and oscillatory movement relative thereto, means for imparting rotation to said blade assembly, the individual blades of said blade assembly adapted to receive a series of fruit for rotation therewith, the fruit being impaled on the ends of the blades and forced therealong by the impalement of additional fruit on the blade ends, and means in the path of movement of said push rods as they rotate with the blade assembly and engageable by the push rods to cause reciprocation of said push rods and the blades, and further means in the path of reciprocatory movement of said push rods and engageable therewith to cause oscillation of the push rods and the blades.

4. A fruit sectionizing apparatus in accordance with claim 3, wherein said further means comprises a fixed lug in the blade assembly for each push rod and a cam element fixed to and movable with each push rod and engageable with a lug to cause oscillation of the push rod and blade.

5. A fruit sectionizing apparatus including, in combination, a blade assembly comprising a plurality of individual coring and separating blades, said blade assembly having a fruit receiving end and the opposite end of said blade assembly being a fruit and core ejecting end, means for imparting rotation to said blade assembly, the individual blades of said blade assembly adapted to receive a series of fruit for rotation therewith, each fruit being impaled on the receiving end of the blade assembly and forced therealong by the impalement of additional fruit on the receiving end of the blade assembly, mechanism for imparting reciprocating motion to each blade and further mechanism for imparting an oscillating motion to each blade as it reciprocates, means on each of said blades for separating the core of the fruit from the apices of the fruit sections, and further means on said blades for separating the membranes from the fruit sections.

6. A fruit sectionizing apparatus including, in combination, a blade assembly comprising a plurality of individual coring and separating blades, said blade assembly having a fruit receiving end and the opposite end of said blade assembly being a fruit and core ejecting end, means for imparting rotation to said blade assembly, the individual blades of said blade assembly adapted to receive a series of fruit for rotation therewith, each fruit being impaled on the receiving end of the blade assembly and forced therealong by the impalement of additional fruit on the receiving end of the blade assembly, means on each of said blades for separating the core of the fruit from the apices of the fruit setcions, said last named means comprising a plane blade length having a pointed end upon which the fruit is impaled, and said pointed end is displaced relative to the longitudinal center axis of the plane blade length, and further means on said blades for separating the membranes from the fruit sections.

7. A fruit sectionizing apparatus including, in combination, a blade assembly comprising a plurality of individual coring and separating blades, said blade assembly having a fruit receiving end and the opposite end being a fruit and core ejecting end, the blades being arranged in a circular fashion in the blade assembly providing an inner area encircled by the blades, and the blades being operatively mounted on a substantially common horizontal plane and being of progressively less length from the longest to the shortest, means for imparting rotation to said blade assembly, the individual blades of said blade assembly adapted to receive a series of fruit for rotation therewith, each fruit being impaled on the receiving end of the blade assembly and forced therealong by the impalement of additional fruit on the receiving end of the blade assembly, means on each of said blades for separating the core of the fruit from the apices of the fruit sections, and further means on said blades for separating the membranes from the fruit sections.

8. A fruit sectionizing apparatus including, in combination, a blade assembly comprising a plurality of individual coring and separating blades, said blade assembly having a fruit receiving end and the opposite end being a fruit and core ejecting end, means for imparting rotation to said blade assembly, the blades being arranged in a circular fashion in the blade assembly providing an inner area encircled by the blades and a guide element is centrally mounted in the inner area and extends upwardly beyond the upper ends of the blades and rotates therewith, the individual blades of said blade assembly adapted to receive a series of fruit for rotation therewith, each fruit being impaled on the receiving end of the blade assembly and forced therealong by the impalement of additional fruit on the receiving end of the blade assembly, means on each of said blades for separating the core of the fruit from the apices of the fruit sections, and further means on said blades for separating the membranes from the fruit sections.

References Cited in the file of this patent

UNITED STATES PATENTS

| | | |
|---|---|---|
| 2,129,101 | Polk | Sept. 6, 1938 |
| 2,199,345 | Polk et al. | Apr. 30, 1940 |
| 2,750,976 | Ganze | June 19, 1956 |
| 3,030,995 | Shrewsbury | Apr. 24, 1962 |